United States Patent
Okubo et al.

(10) Patent No.: US 8,049,449 B2
(45) Date of Patent: Nov. 1, 2011

(54) BRUSHLESS MOTOR CONTROL METHOD AND BRUSHLESS MOTOR

(75) Inventors: Masayuki Okubo, Kiryu (JP); Takeshi Yamazaki, Kiryu (JP); Youichirou Shikine, Kiryu (JP)

(73) Assignee: Mitsuba Corporation, Gunma (JP)

( * ) Notice: Subject to any disclaimer, the term of this patent is extended or adjusted under 35 U.S.C. 154(b) by 552 days.

(21) Appl. No.: 12/223,465

(22) PCT Filed: Feb. 7, 2007

(86) PCT No.: PCT/JP2007/052093
§ 371 (c)(1),
(2), (4) Date: Sep. 11, 2008

(87) PCT Pub. No.: WO2007/094210
PCT Pub. Date: Aug. 23, 2007

(65) Prior Publication Data
US 2009/0128073 A1 May 21, 2009

(30) Foreign Application Priority Data
Feb. 16, 2006 (JP) .................................. 2006-038870

(51) Int. Cl.
*H02P 6/10* (2006.01)
(52) U.S. Cl. ......... 318/400.23; 318/400.01; 318/400.34; 318/400.35
(58) Field of Classification Search ............. 318/400.01, 318/400.23, 400.32, 400.34, 400.35
See application file for complete search history.

(56) References Cited

U.S. PATENT DOCUMENTS

| | | | | |
|---|---|---|---|---|
| 4,641,066 A | * | 2/1987 | Nagata et al. | 318/400.37 |
| 4,912,378 A | * | 3/1990 | Vukosavic | 318/400.04 |
| 4,922,169 A | * | 5/1990 | Freeman | 318/400.1 |
| 5,345,156 A | * | 9/1994 | Moreira | 318/400.04 |
| 5,422,570 A | * | 6/1995 | Moreira | 324/177 |
| 5,473,240 A | * | 12/1995 | Moreira | 318/801 |
| 5,481,166 A | * | 1/1996 | Moreira | 318/400.04 |

(Continued)

FOREIGN PATENT DOCUMENTS
JP 06-098596 4/1994
(Continued)

OTHER PUBLICATIONS
International Search Report mailed May 15, 2007 for International Application No. PCT/JP2007/052093.

(Continued)

*Primary Examiner* — Walter Benson
*Assistant Examiner* — Thai Dinh
(74) *Attorney, Agent, or Firm* — Wenderoth, Lind & Ponack, L.L.P.

(57) ABSTRACT

In a brushless motor for an electric power steering device having a configuration of 2 poles and 3 slots, or of an integral multiple thereof, a stator coil is supplied with current containing a higher harmonic component. A difference of 0.5% to 1.5% is provided between the higher harmonic component content rate of the stator coil current and the higher harmonic component content rate of the induced electromotive force generated in the stator coil with rotation of a permanent magnet, thereby mitigating the influence by an armature reaction generated in the induced electromotive force to reduce torque ripples. The difference between the higher harmonic component content rates is set on the basis of a change that occurs in the induced electromotive force due to the armature reaction at a time of supplying electricity to the armature coil.

18 Claims, 4 Drawing Sheets

(INDUCED VOLTAGE HIGHER HARMONIC WAVE CONTENT RATE)
− (CURRENT WAVEFORM HIGHER HARMONIC WAVE SET CONTENT RATE)[ %]

U.S. PATENT DOCUMENTS 6,081,091 A * 6/2000 Mitchell et al. ............... 318/685
7,256,564 B2 * 8/2007 MacKay .................. 318/400.34

FOREIGN PATENT DOCUMENTS

| JP | 2000-341984 | 12/2000 |
| JP | 2004-274963 | 9/2004 |

OTHER PUBLICATIONS

International Preliminary Report on Patentability mailed Aug. 28, 2008 for International Application No. PCT/JP2007/052093.

Written Opinion of the International Searching Authority mailed Aug. 28, 2008 for International Application No. PCT/JP2007/052093.

* cited by examiner

[FIG. 1]
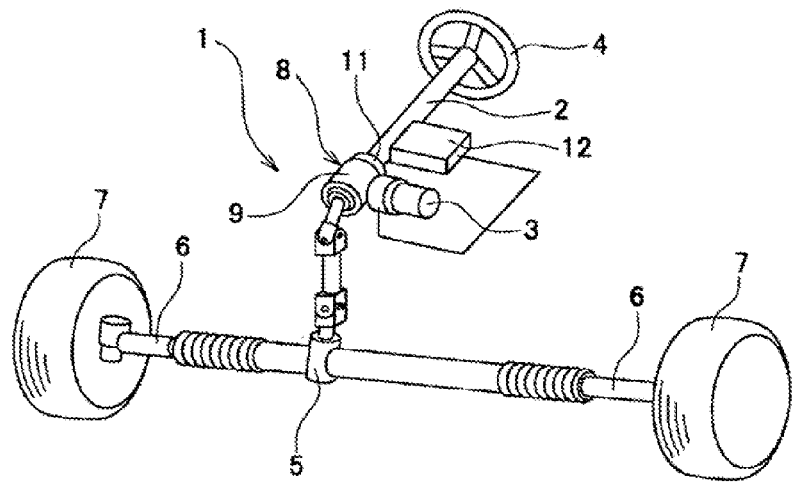
[FIG. 2]
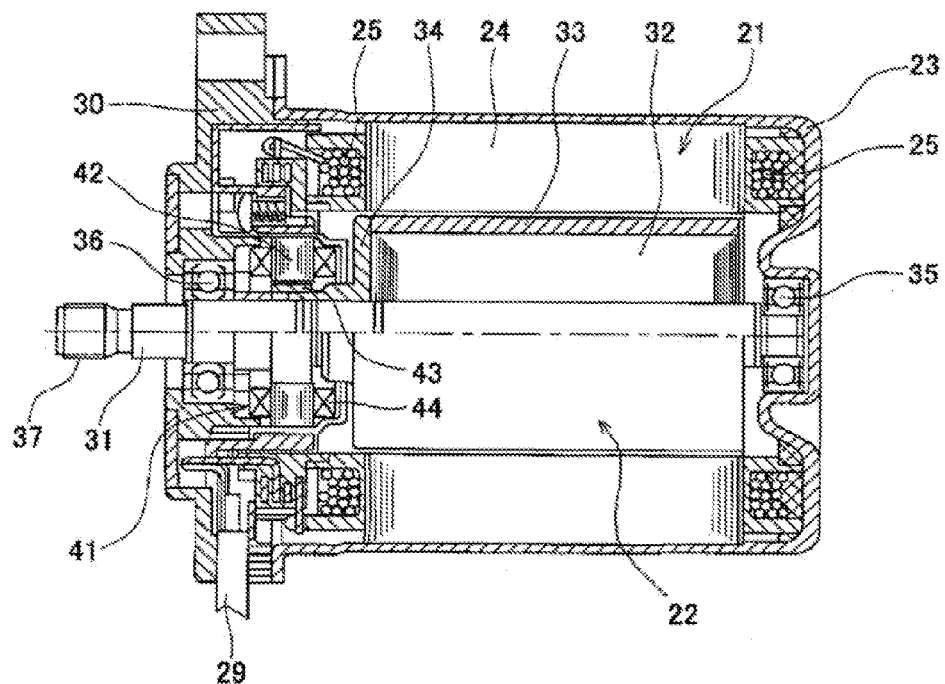

[FIG. 3]
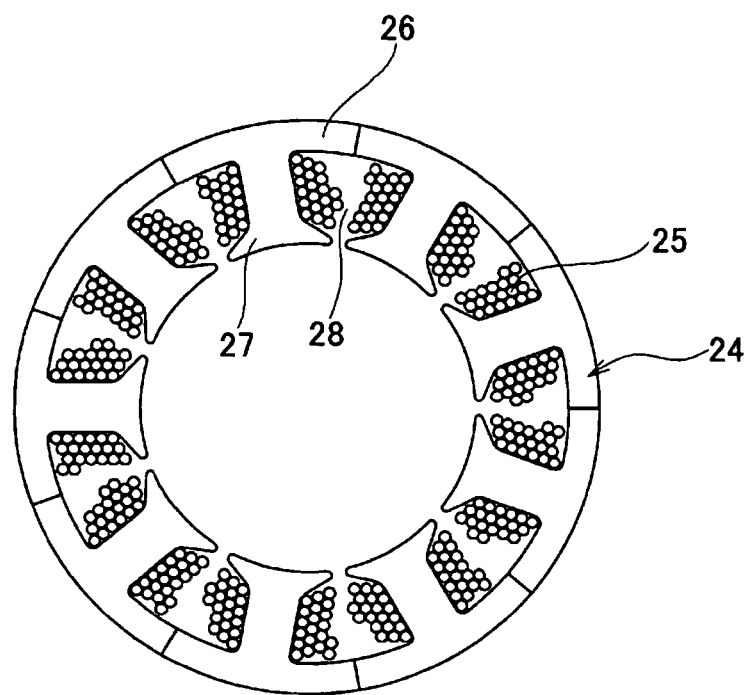

[FIG. 4]
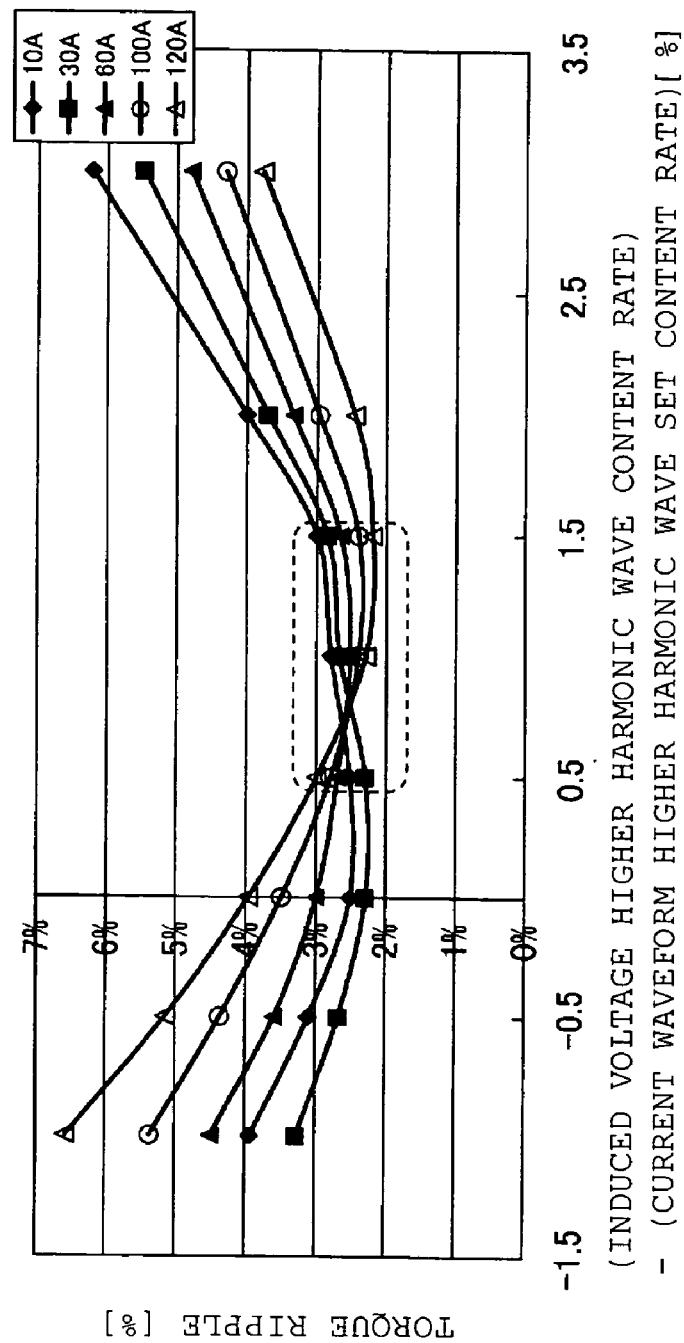

[FIG. 5]
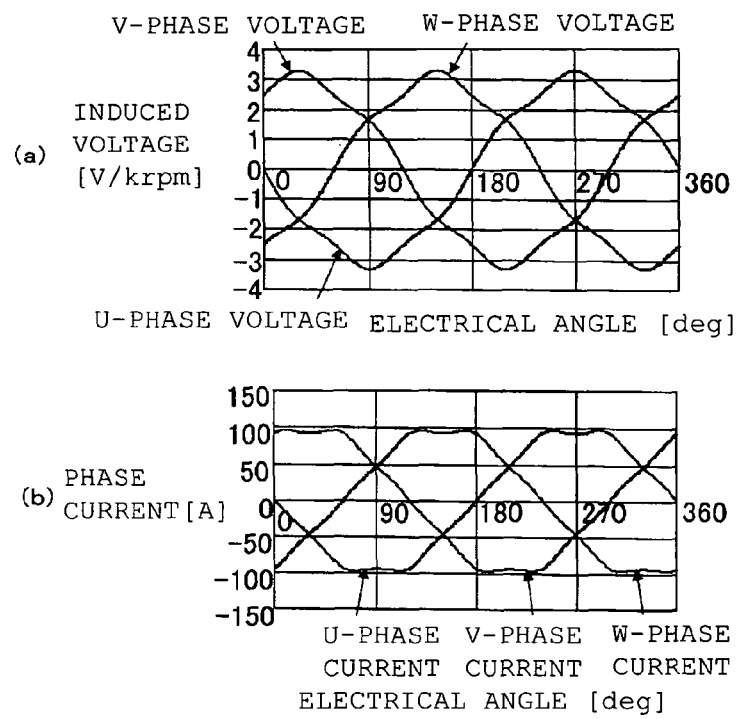
[FIG. 6]
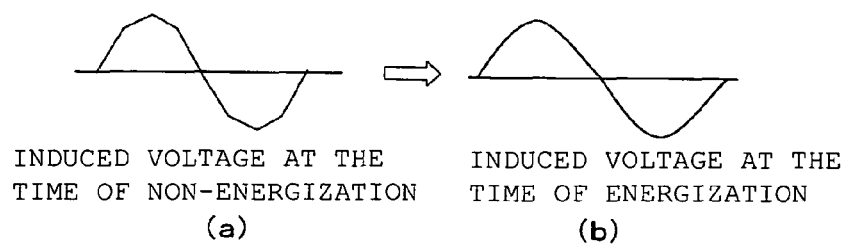
| INDUCED VOLTAGE AT THE | INDUCED VOLTAGE AT THE |
| TIME OF NON-ENERGIZATION | TIME OF ENERGIZATION |
| (a) | (b) |

BRUSHLESS MOTOR CONTROL METHOD AND BRUSHLESS MOTOR

BACKGROUND OF THE INVENTION (1) Field of the Invention

The present invention relates to a brushless motor and a method of controlling a brushless motor, and more particularly to a technique that may be effectively applied to a brushless motor for an electric power steering device.

(2) Description of Related Art

In order to assist a steering force of an automobile, in recent years, a large number of vehicles are provided with so-called power steering devices. As the power steering devices of this type, in recent years, the number of vehicles to which electric type power steering devices (so-called electric power steering device, hereinafter appropriately abbreviated as "EPS") are mounted is increasing from the viewpoints of a reduction in engine load or a reduction in weight. As a power source of the EPS, motors with brushes have been used much hitherto. In recent years, however, the brushless motors have been increasingly used because of excellent maintenance property of the brushless motors and high torque generation with small size.

In such ESP motor described above, attention is focused on an operation noise reduction for improvement of the driver's operation feeling. In general, the torque variation (torque ripple) and the operation noise are closely related with each other, and torque ripple reductions involving designing an energizing method have been variously studied for the EPS motor, particularly, the brushless motor. For example, it is well known that a sine wave drive that enables smooth energization is conducted instead of a square wave drive as the measures against the operation noises. However, in the case of the sine wave drive, an induced voltage waveform at the motor side must be converted into a sine wave configuration in order to reduce the torque ripple. For that reason, in the sine wave drive motor, the induced voltage waveform is converted into the sine wave waveform by skew or an eccentricity of a magnet. In this case, it is a reality that an output of the motor must be sacrificed to some extent.

Under the above circumstances, there is also developed a method of driving a motor by an aid of a trapezoidal wave current containing higher harmonic waves instead of the sine wave drive in order to improve the reduction in motor output as described above. In the brushless motor having six poles and nine slots, for example, when about 5% of fifth-order higher harmonic components are included in the induced voltage waveform, a current waveform corresponding to that waveform is determined to be energized, and hence the torque ripple may be reduced to 0 in theory. FIG. 5(a) is an explanatory diagram showing an induced voltage waveform, and FIG. 5(b) is an explanatory diagram showing a phase current waveform. The induced voltage waveform of FIG. 5(a) mainly contains 5% of the fifth-order higher harmonic components. Also, the phase current of FIG. 5(b) contains 5% of the higher harmonic components (fifth-order components: 2.5%, seventh-order components: 2.5%) in correspondence with the induced voltage waveform.

In this example, a torque T, an angular velocity ω, an induced voltage E, and the phase current I satisfy the following relationship (θ is an electrical angle, u, v, and w are current phases, d is a component in the direction of a magnetic flux, and q is a component orthogonal to the magnetic flux).

$$T(\theta) \cdot \omega(\theta) = Eu(\theta) \cdot Iu(\theta) + Ev(\theta) \cdot Iv(\theta) + Ew(\theta) \cdot Iw(\theta) \quad \text{(Ex. 1)}$$
$$= Ed(\theta) \cdot Id(\theta) + Eq(\theta) \cdot Iq(\theta)$$

In the above expression, a component involved in the torque of the motor is a q-axis component, and a d-axis component may be ignored in considering the torque variation. Therefore, when ω(θ) is held constant, T(θ) should be held constant, that is, E·I should be held constant in order to eliminate the torque variation. When the phase current waveform shown in FIG. 5(b) is determined from the above relationship to be supplied, E·I=T is held constant with respect to the induced voltage of FIG. 5(a), thereby suppressing the torque variation.

As a result, when the phase current shown in FIG. 5(b) is supplied, the torque variation that is not different from that of the sine wave drive may be realized. Also, when the trapezoidal wave and the sine wave are compared with each other at the same peak current, the trapezoidal wave may increase the peak value of the first-order component that contributes to the torque. For that reason, the supply of a current shown in FIG. 5(b) makes it possible to obtain higher torque than that in the motor of the sine wave drive. Also, because the higher harmonic waves are contained in the supplied current, the skew angle may be set to a small value, and a leakage flux is reduced accordingly, to thereby improve the output.

Patent Document 1: Jpn. Pat. Appln. Laid-Open Publication No. 2004-274963

BRIEF SUMMARY OF THE INVENTION

When energization is conducted with the above-mentioned current waveform containing the higher harmonic waves, the induced voltage waveform is always converted into the sine wave due to an influence of an armature reaction at the time of energization. That is, as shown in FIG. 6, even when the induced voltage at the time of non-energization has the substantially trapezoidal waveform containing the higher harmonic waves (FIG. 6(a)), the induced voltage dulls (the corners thereof are so deformed as to be rounded) so as to be converted into the sine waveform as shown in FIG. 6(b). For that reason, there arises such a problem that the torque is varied, and particularly the torque variation at higher current (higher load) side is increased. The operation noises of the motor become larger as the torque variation becomes larger. In particular, when the motor of the above type is used for the EPS, there arises such a problem that the operation noises continuously change, thereby causing a deterioration of the steering feeling because a load that is applied to the motor changes according to the travel state in the EPS.

The present invention has an object to provide a method of controlling a brushless motor, which is capable of reducing the motor operation noises and of outputting higher torque than that of the sine wave drive while maintaining the low torque ripple to the same level as in the sine wave drive, and such a brushless motor.

Means for Solving the Problems

According to the present invention, there is provided a method of controlling a brushless motor comprising a stator having an armature coil, and a rotor having a permanent magnet and being rotatably arranged at an inside or outside of the stator, the method comprising:

supplying a current containing a higher harmonic component to the armature coil; and providing a given amount of difference between a higher harmonic component content rate of the current and a higher harmonic component content rate of an induced electromotive force which is generated in the armature coil with the rotation of the permanent magnet.

In the method of controlling a brushless motor according to the present invention, the given amount of difference is provided between the higher harmonic component content rate of the armature coil current and the higher harmonic component content rate of the induced electromotive force which is generated in the armature coil. As a result, an influence of an armature reaction that is generated in the induced electromotive force is mitigated. That is, the content rate of the higher harmonic component is adjusted by the given amount in advance to supply electricity to the armature coil taking into consideration the conversion of the induced voltage waveform into the sine waveform due to the armature reaction, thereby correcting the current waveform in correspondence with the induced voltage waveform at the time of energization. For that reason, E·I in the above Expression (1) is held constant by an actual induced voltage waveform at the time of energization and by the corrected current waveform, to thereby suppress the torque ripple.

In the method of controlling a brushless motor, the difference between the higher harmonic component content rates may be set on the basis of a change that occurs in the induced electromotive force by the armature reaction at the time of supplying the electricity to the armature coil. Also, the difference between the higher harmonic component content rates may be set to 0.5% to 1.5%. On the other hand, the brushless motor may be formed of two poles and three slots, or of an integral multiple thereof, and the brushless motor may be used as a drive source of an electric power steering device.

On the other hand, according to the present invention, there is provided a brushless motor comprising a stator having an armature coil, and a rotor having a permanent magnet and being rotatably arranged at an inside or outside of the stator, wherein a current containing a higher harmonic component is supplied to the armature coil, and a higher harmonic component content rate of the current has a given amount of difference from a higher harmonic component content rate of an induced electromotive force which is generated in the armature coil with the rotation of the permanent magnet.

In the brushless motor according to the present invention, the given amount of difference exists between the higher harmonic component content rate of the armature coil current and the higher harmonic component content rate of the induced electromotive force which is generated in the armature coil. As a result, the influence of the armature reaction that is generated in the induced electromotive force is mitigated. That is, the current waveform is corrected in correspondence with the induced voltage waveform at the time of energization, and a current obtained by adjusting the content rate of the higher harmonic component by the given amount in advance is supplied to the armature coil taking into consideration the conversion of the induced voltage waveform into the sine waveform due to the armature reaction. For that reason, E·I in the above Expression (1) is held constant by the actual induced voltage waveform at the time of energization and the corrected current waveform, to thereby suppress the torque ripple.

Effects of the Invention

According to the method of controlling a brushless motor of the present invention, the current that contains the higher harmonic component is supplied to the armature coil of the brushless motor including the stator having the armature coil and the rotor provided with the permanent magnet and is rotatably arranged at the inside or outside of the stator. Also, the given amount of difference is provided between the higher harmonic component content rate of the armature coil current and the higher harmonic component content rate of the induced electromotive force which is generated in the armature coil with the rotation of the permanent magnet. As a result, the current waveform of the armature coil is corrected in correspondence with the induced voltage waveform at the time of energization, and the influence of the armature reaction that is generated in the induced electromotive force is mitigated, thereby making it possible to suppress the torque ripple. For that reason, the motor operation noises may be reduced, and changes in the operation noises within the operating region may be suppressed.

Thus, the application of the control method of the present invention to the EPS motor allows the torque variation of the motor to be suppressed even if the motor load is varied according to the road surface conditions, thereby allowing a reduction in the motor operation noises. For that reason, the silent and stable steering operation may be conducted to improve the steering feeling.

According to the brushless motor of the present invention, the current containing the higher harmonic component is supplied to the armature coil in the brushless motor including the stator having the armature coil and the rotor having the permanent magnet and is rotatably arranged at the inside or outside of the stator. Also, the given amount of difference exists between the higher harmonic component content rate of the armature coil current and the higher harmonic component content rate of the induced electromotive force which is generated in the armature coil with the rotation of the permanent magnet. As a result, the current of the waveform that has been corrected in correspondence with the induced voltage waveform at the time of energization may be supplied to the armature coil, and the influence of the armature reaction that is generated in the induced electromotive force is mitigated, thereby being capable of suppressing the torque ripple. For that reason, the motor operation noises may be reduced, and changes in the operation noises within the operating region may be suppressed.

Consequently, the application of a brushless motor of the present invention to the EPS motor allows the torque variation of the motor to be suppressed even if the motor load is varied according to the road surface conditions, thereby being possible to reduce the motor operation noises. For that reason, the silent and stable steering operation may be conducted to improve the steering feeling.

BRIEF DESCRIPTION OF THE DRAWINGS

FIG. 1 A perspective view showing a configuration of an electric power steering device using a brushless motor according to the present invention.

FIG. 2 A cross-sectional view showing the configuration of a brushless motor that is used in the electric power steering device of FIG. 1.

FIG. 3 An explanatory diagram showing a configuration of a stator core in the brushless motor of FIG. 2.

FIG. 4 A graph showing a relationship between a reduced amount of a higher harmonic component and a torque ripple in a phase current.

FIG. 5 (a) is an explanatory diagram showing an induced voltage waveform in the brushless motor, and (b) is an explanatory diagram showing a phase current waveform thereof.

FIG. 6 (a) is an explanatory diagram showing an induced voltage waveform at the time of non-energization in the brushless motor, and (b) is an explanatory diagram showing the induced voltage waveform at the time of energization.

DESCRIPTION OF SYMBOLS 1 electric power steering device
2 steering shaft
3 motor
4 steering wheel
5 steering gear box
6 tie rod
7 wheel
8 assist motor portion
9 speed reduction mechanism portion
11 torque sensor
12 control unit
21 stator
22 rotor
23 housing
24 stator core
25 winding wire
26 yoke
27 teeth
28 slot
29 power supply wiring
30 bracket
31 rotating shaft
32 rotor core
33 magnet
34 magnet holder
35 bearing
36 bearing
37 spline portion
41 resolver
42 resolver stator
43 resolver rotor
44 coil

DETAILED DESCRIPTION OF THE INVENTION

Hereinafter, a description is given of an embodiment of the present invention with reference to the drawings. FIG. 1 is a perspective view showing a configuration of an electric power steering device using a brushless motor according to the present invention. An electric power steering device (EPS) 1 shown in FIG. 1 is a column assist type in which an operating assist force is supplied to a steering shaft 2. In the EPS 1, a motor 3 to which the control method according to the present invention is applied is used as a power source.

A steering wheel 4 is fixed to the steering shaft 2. The steering force of the steering wheel 4 is transmitted to tie rods 6 through a pinion and a rack shaft (not shown) which are arranged within a steering gear box 5. Wheels 7 are connected to both ends of the tie rods 6. When the tie rods 6 operate with the operation of the steering wheels 4, the wheels 7 are steered right and left through knuckle arms (not shown).

In the EPS 1, an assist motor portion 8 that is a steering force assist mechanism is provided to the steering shaft 2. The assist motor portion 8 includes a reduction mechanism portion 9 and a torque sensor 11 together with the motor 3. In the reduction mechanism portion 9, a worm and a worm wheel (not shown) are provided. The rotation of the motor 3 is reduced in speed and transmitted to the steering shaft 2 by means of the reduction mechanism portion 9. The motor 3 and the torque sensor 11 are connected to a control unit (ECU) 12.

When the steering wheel 4 is operated to rotate the steering shaft 2, the torque sensor 11 is operated. The ECU 12 appropriately supplies an electric power to the motor 3 on the basis of a detection torque of the torque sensor 11. When the motor 3 is operated, the rotation of the motor 3 is transmitted to the steering shaft 2 through the reduction mechanism portion 9, and the steering assist force is supplied to the steering shaft 2. The steering shaft 2 rotates due to the steering assist force and a manual steering force. The rotary motion is converted into a linear motion of the rack shaft by the rack and pinion coupling within the steering gear box 5 to conduct the steering operation of the wheels 7.

FIG. 2 is a cross-sectional view showing a configuration of the motor 3. As shown in FIG. 2, the motor 3 is of an inner rotor type brushless motor in which a stator 21 is arranged outside and a rotor 22 is arranged inside. The stator 21 is so configured as to include a housing 23, a stator core 24 that is fixed to the inner peripheral side of the housing 23, and a winding wire 25 that is wound on the stator core 24. The housing 23 is formed in a bottomed cylindrical shape made of iron, or the like. A bracket 30 that is made of a synthetic resin is fixed to an opening of the housing 23. The stator core 24 is constituted by laminating a large number of steel plates on each other. A plurality of teeth are projected on the inner peripheral side of the stator core 24.

FIG. 3 is an explanatory diagram showing a configuration of the stator core 24. The stator core 24 includes ring-shaped yoke 26, and teeth 27 that are projected inward from the yoke 26. The number of teeth 27 is nine. Slots 28 (nine pieces) are defined between the respective teeth 27, and the motor 3 is configured by nine slots. A winding wire 25 is wound around each of the teeth 27 by concentrated winding, and the winding wires 25 are housed within each of the slots 28. The winding wires 25 are connected to a battery (not shown) through a power supply wiring 29. A phase current (U, V, W) of a trapezoidal wave form containing higher harmonic components therein is supplied to the winding wires 25.

The rotor 22 is disposed inside of the stator 21, and configured in such a manner that a rotating shaft 31, a rotor core 32, and magnets 33 are arranged coaxially. The cylindrical rotor core 32 obtained by laminating a large number of steel plates on each other is fixed to an outer periphery of the rotating shaft 31. The magnets 33 of the segment type are disposed on an outer periphery of the rotor core 32. The magnets 33 are fitted to a magnet holder 34 that is fixed to the rotating shaft 31. The six magnets 33 are arranged along the peripheral direction. That is, the motor 3 is configured by six poles and nine slots.

One end of the rotating shaft 31 is rotatably supported by bearings 35 that are press-fitted into the bottom of the housing 23. Another end of the rotating shaft 31 is rotatably supported by bearings 36 that are fitted to the bracket 30. A spline portion 37 is formed on the another end of the rotating shaft 31 (left end of FIG. 2), and connected to the worm shaft of the reduction mechanism portion 9 by a joint member (not shown). A worm is formed on the worm shaft, and meshed with the worm wheel that is fixed to the steering shaft 2 by the reduction mechanism portion 9.

The bearings 36 and a resolver 41 that detects the rotation of the rotor 22 are housed within the bracket 30. The resolver 41 includes a resolver stator 42 that is fixed to the bracket 30 side, and a resolver rotor 43 that is fixed to the rotor 22 side. A coil 44 is wound around the resolver stator 42 to be provided with an excitation coil and a detection coil. The resolver rotor 43 that is fixed to the left end of the magnetic holder 34 is disposed inside of the resolver stator 42. The resolver rotor 43 is configured by laminating metal plates on each other, and has projections formed in three directions.

When the rotating shaft 31 rotates, the resolver rotor 43 also rotates within the resolver stator 42. A high frequency signal is supplied to the excitation coil of the resolver stator 42 to change the phase of the signal that is output from the detection coil in response to the approach and recession of the projections. The detection signal and the reference signal are compared with each other to detect the rotational position of the rotor 22. Then, a current supplied to the winding wires 25 is appropriately changed over on the basis of the rotational position of the rotor 22 to rotationally drive the rotor 22.

In the above EPS 1, when the steering wheel 4 is operated to rotate the steering shaft 2, the rack shaft is moved in a direction corresponding to the rotation to conduct the steering operation. The torque sensor 11 is operated by the above operation, and an electric power is supplied to the winding wires 25 from the battery (not shown) through the power supply wiring 29 according to the detected torque. When the electric power is supplied to the winding wires 25, the motor 3 is operated to rotate the rotational shaft 31 and the worm shaft. The rotation of the worm shaft is transmitted to the steering shaft 2 through the worm wheel to assist the steering force.

In operating the EPS 1, in order to suppress the torque variation while keeping the motor output, the phase current of the trapezoidal waveform as shown in FIG. 5(b) is supplied to the motor 3. However, the induced voltage waveform is converted into the sine waveform by the armature reaction when the current is supplied to the winding wire 25 as described above. For that reason, when the phase current as shown in FIG. 5(b) containing 5% of the higher harmonic component as in the case of induced voltage waveform is supplied, the torque variation at higher current side tends to increase. Under the circumstances, in the control method according to the present invention, the content rate of the higher harmonic components is reduced and set by a given quantity in advance to be supplied, taking into consideration the conversion of the induced voltage waveform into the sine waveform due to the energization with respect to the current waveform obtained on the basis of (Ex. 1).

FIG. 4 is a graph showing a relationship between the reduced amount of a higher harmonic component and a torque ripple in a phase current, which has been obtained by experiments made by the inventors of the present invention. As shown in FIG. 4, in the case where the content rate of the higher harmonic components is set to a lower value by 0.5% to 1.5% (for example, when the induced voltage waveform contains 5% of the higher harmonic components, the content rate of the higher harmonic components of the respective phase supply current is reduced from 5% by 0.5% to 1.5% to obtain 4.5% to 3.5%. When the higher harmonic component is 2.5% in the fifth-order component and 2.5% in the seventh-order component, both of those components are reduced in even shares), the torque ripple is minimized, and the torque ripple may be suppressed to about 2% to 3% even at the time of the high load (120 A). Also, the variation level of the torque ripple may also be suppressed to 1% or lower with respect to the load (current value) variation.

As described above, the content rate of the higher harmonic components in the phase current is set to the lower value by 0.5% to 1.5% taking into consideration the conversion of the induced voltage waveform into the sine waveform due to the armature reaction, to thereby correct the current waveform in correspondence with the induced voltage waveform at the time of energization. For that reason, the influence of the armature reaction is mitigated, and E·I in Expression (1) described above is held constant to suppress the torque ripple. Accordingly, the torque variation of the motor 3 may be suppressed to the small value, the operation noises may be reduced, and a change in the operation noises within the operating region may be suppressed. In this case, because the supply current is basically of the trapezoidal waveform, the advantage that the high torque may be obtained at the same peak current as compared with the sine wave drive is not impaired.

Also, with the application of the control method according to the present invention, even if a load that is applied to the motor 3 varies due to the road surface condition, the torque variation in the motor 3 is suppressed to a small value, thereby making it possible to reduce the motor operation noises. According, even if the road surface condition changes, the silent and stable steering operation may be realized, thereby making it possible to improve the steering feeling.

The present invention is not limited to the above-mentioned embodiment, but may be variously modified without departing from the scope of the invention.

For example, in the above-mentioned embodiment, the content rate of the higher harmonic components in the phase current is reduced. Alternatively, the waveform at the induced voltage waveform side may be adjusted, and the content rate of the higher harmonic components in the induced voltage waveform may be set to a higher value by 0.5% to 1.5% than the fifth-order higher harmonic component content rate for setting the current waveform of the phase current. That is, any one of the induced voltage waveform side and the phase current side may be adjusted, and the point is that a difference may be provided between the higher harmonic component content rates of the two sides by the amount that reduces the influence of the armature reaction.

Also, in the above-mentioned embodiment, the motor of six poles and nine slots is exemplified as the motor 3. However, the motor configuration is not limited thereto, and the configuration in which the content rate difference between the higher harmonic components is set to 0.5% to 1.5% is also applicable to the motor of the integral multiple of two poles and three slots. Further, in the above-mentioned embodiment, the inner rotor type brushless motor is exemplified. However, the present invention may also be applied to the outer rotor type brushless motor in which the rotor is arranged outside of the stator. In addition, in the above-mentioned embodiment, the control method according to the present invention is applied to the motor of the column assist type EPS. Alternatively, the control method according to the present invention may also be applied to the EPS motor of the rack assist type in which the motor is arranged coaxially with the rack shaft, or the EPS motor of the pinion assist type in which the assist force is supplied to the pinion gear that is meshed with the rack shaft.

The invention claimed is:

1. A method of controlling a brushless motor which has a stator having an armature coil, and a rotor having a permanent magnet and being rotatably arranged at an inside or outside of the stator, the method comprising:

supplying a current containing a higher harmonic component to the armature coil; and correcting a waveform of the current in correspondence with an induced voltage waveform at a time of energizing the motor by providing a given amount of difference between a higher harmonic component content rate of the current and a higher harmonic component content rate of an induced electromotive force which is generated in the armature coil with the rotation of the permanent magnet.

2. The method of claim 1, wherein the given amount of difference between the higher harmonic component content rates is set on the basis of a change that occurs in the induced electromotive force due to an armature reaction at a time of supplying electricity to the armature coil.

3. The method of claim 2, wherein the given amount of difference between the higher harmonic component content rates is 0.5 to 1.5%.

4. The method of claim 3, wherein the brushless motor has two poles and three slots or an integral multiple of two poles and three slots.

5. The method of claim 3, wherein the brushless motor is used as a drive source of the electric power steering device.

6. The method of claim 2, wherein the brushless motor has two poles and three slots or an integral multiple of two poles and three slots.

7. The method of claim 6, wherein the brushless motor is used as a drive source of the electric power steering device.

8. The method of claim 2, wherein the brushless motor is used as a drive source of the electric power steering device.

9. The method of claim 1, wherein the given amount of difference between the higher harmonic component content rates is 0.5 to 1.5%.

10. The method of claim 9, wherein the brushless motor has two poles and three slots or an integral multiple of two poles and three slots.

11. The method of claim 10, wherein the brushless motor is used as a drive source of the electric power steering device.

12. The method of claim 9, wherein the brushless motor is used as a drive source of the electric power steering device.

13. The method of claim 1, wherein the brushless motor has of two poles and three slots or an integral multiple of two poles and three slots.

14. The method of claim 13, wherein the brushless motor is used as a drive source of the electric power steering device.

15. The method of claim 1, wherein the brushless motor is used as a drive source of the electric power steering device.

16. A brushless motor comprising:
a stator having an armature coil; and
a rotor having a permanent magnet and being rotatably arranged at an inside or outside of the stator,
wherein a current containing a higher harmonic component is supplied to the armature coil, and a waveform of the current is corrected in correspondence with an induced voltage waveform at a time of energizing the motor by providing a given amount of difference between a higher harmonic component content rate of the current and a higher harmonic component content rate of an induced electromotive force which is generated in the armature coil with the rotation of the permanent magnet.

17. The motor of claim 16, wherein the given amount of difference between the higher harmonic component content rates is 0.5 to 1.5%.

18. A method of controlling a brushless motor which has a stator having an armature coil, and a rotor having a permanent magnet and being rotatably arranged at an inside or outside of the stator, the method comprising:
supplying a current containing a higher harmonic component to the armature coil; and
correcting a waveform of the current in correspondence with an induced voltage waveform at a time of energizing the motor by providing a given amount of difference between a higher harmonic component content rate of the current and a higher harmonic component content rate of an induced electromotive force which is generated in the armature coil with the rotation of the permanent magnet, the given amount of difference being based on a change that occurs in the induced electromotive force due to an armature reaction at a time of supplying electricity to the armature coil.

* * * * *